United States Patent [19]

Merchant et al.

[11] Patent Number: 5,762,817
[45] Date of Patent: Jun. 9, 1998

[54] DECAFLUOROPENTANE COMPOSITIONS

[75] Inventors: Abid Nazarali Merchant, Wilmington, Del.; Barbara Haviland Minor, Elkton, Md.

[73] Assignee: E. I. du Pont de Nemours and Company, Wilmington, Del.

[21] Appl. No.: 805,394

[22] Filed: Feb. 24, 1997

Related U.S. Application Data

[60] Provisional application No. 60/015,321, Apr. 12, 1996.

[51] Int. Cl.$^6$ .................... C09K 5/04; C09K 3/30; C08J 9/14; C11D 7/50; C23G 5/28
[52] U.S. Cl. .................... 252/67; 252/305; 510/177; 510/410; 510/411; 134/38; 134/2; 134/40; 134/42; 62/114; 62/324.1; 264/53; 264/DIG. 5; 521/910
[58] Field of Search .................... 510/177, 410, 510/411; 252/67, 305; 134/38, 2, 40, 42; 62/114, 324.1; 264/53, DIG. 5; 521/910

[56] References Cited

U.S. PATENT DOCUMENTS

| | | |
|---|---|---|
| 5,064,559 | 11/1991 | Merchant et al. .................... 252/171 |
| 5,194,170 | 3/1993 | Merchant et al. .................... 252/67 |
| 5,196,137 | 3/1993 | Merchant .................... 252/172 |
| 5,250,208 | 10/1993 | Merchant et al. .................... 252/67 |
| 5,268,122 | 12/1993 | Rao et al. .................... 252/171 |
| 5,531,916 | 7/1996 | Merchant .................... 510/412 |
| 5,558,810 | 9/1996 | Minor et al. .................... 252/67 |
| 5,578,137 | 11/1996 | Shealy .................... 134/42 |
| 5,580,906 | 12/1996 | Merchant et al. .................... 521/88 |
| 5,610,128 | 3/1997 | Zyhowski et al. .................... 510/288 |
| 5,626,790 | 5/1997 | Minor .................... 252/67 |

FOREIGN PATENT DOCUMENTS

| | | |
|---|---|---|
| 610507 | 8/1994 | European Pat. Off. . |
| 710715 | 5/1996 | European Pat. Off. . |
| 97/05211 | 2/1997 | WIPO . |

Primary Examiner—Douglas J. McGinty

[57] ABSTRACT

Azeotropic or azeotrope-like compositions of effective amounts of 1,1,1,2,3,4,4,5,5,5-decafluoropentane, 1,1-dichloroethane and an alcohol such as methanol, ethanol, or isopropanol, to form an azeotropic or azeotrope-like composition are disclosed that are useful as cleaning agents, refrigerants, aerosol propellants, heat transfer media, gaseous dielectrics, fire extinguishing agents, expansion agents for polyolefins and polyurethanes and as power cycle working fluids.

15 Claims, No Drawings

DECAFLUOROPENTANE COMPOSITIONS

CROSS-REFERENCE TO RELATED APPLICATION

This is application claims the benefit of U.S. Provisional Application No. 60/015,321 filed Apr. 12, 1996.

FIELD OF THE INVENTION

This invention relates to compositions, or mixtures, of fluorinated hydrocarbons and more specifically to azeotropic or azeotrope-like compositions comprising effective amounts of 1,1,1,2,3,4,4,5,5,5-decafluoropentane, 1,1-dichloroethane and an alcohol such as methanol, ethanol, or isopropanol to form an azeotropic or azeotrope-like composition. Such compositions are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a cleaning agent or solvent to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent. Fluorinated hydrocarbons are also useful cleaning agents in vapor degreasing operations.

Preferably, cleaning agents should have a low boiling point, nonflammability, low toxicity, and high solvency power so that flux and flux-residues can be removed without damaging the substrate being cleaned. Further, it is desirable that cleaning agents that include a fluorinated hydrocarbon be azeotropic or azeotrope-like so that they do not tend to fractionate upon boiling or evaporation. If the cleaning agent were not azeotropic or azeotrope-like, the more volatile components of the cleaning agent would preferentially evaporate, and the cleaning agent could become flammable or could have less-desirable solvency properties, such as lower rosin flux solvency and lower inertness toward the electrical components being cleaned. The azeotropic property is also desirable in vapor degreasing operations because the cleaning agent is generally redistilled and reused for final rinse cleaning.

Fluorinated hydrocarbons may also be used as refrigerants. In refrigeration applications, a refrigerant is often lost during operation through leaks in shaft seals, hose connections, solder joints, and broken lines. In addition, the refrigerant may be released to the atmosphere during maintenance procedures on refrigeration equipment. Accordingly, it is desirable to use a single fluorinated hydrocarbon or an azeotropic or azeotrope-like composition that includes one or more fluorinated hydrocarbons as a refrigerant. Some nonazeotropic compositions that include one or more fluorinated hydrocarbons may also be used as refrigerants, but they have the disadvantage of changing composition, or fractionating, when a portion of the refrigerant charge is leaked or discharged to the atmosphere. If a non-azeotropic composition contains a flammable component, the blend could become flammable because of such a change in composition. Refrigerant equipment operation could also be adversely affected due to the change in composition and vapor pressure that results from fractionation.

Azeotropic or azeotrope-like compositions of fluorinated hydrocarbons are also useful as blowing agents in the manufacture of close-cell polyurethane, phenolic and thermoplastic foams. Insulating foams require blowing agents not only to foam the polymer, but more importantly to utilize the low vapor thermal conductivity of the blowing agents, which is an important characteristic for insulation value.

Aerosol products employ both single component fluorinate hydrocarbons and azeotropic or azeotrope-like compositions of fluorinated hydrocarbons as propellant vapor pressure attenuators in aerosol systems. Azeotropic or azeotrope-like compositions, with their substantially constant compositions and vapor pressures, are useful as solvents and propellants in aerosols.

Azeotropic or azeotrope-like compositions that include fluorinated hydrocarbons are also useful as heat transfer media, gaseous dielectrics, fire extinguishing agents, power cycle working fluids such as for heat pumps, inert media for polymerization reactions, fluids for removing particulates from metal surfaces, and as carrier fluids that may be used, for example, to place a fine film of lubricant on metal parts.

Azeotropic or azeotrope-like compositions that include fluorinated hydrocarbons are further useful as buffing abrasive detergents to remove buffing abrasive compounds from polished surfaces such as metal, as displacement drying agents for removing water such as from jewelry or metal parts, as resist-developers in conventional circuit manufacturing techniques employing chlorine-type developing agents, and as strippers for photoresists when used with, for example, a chlorohydrocarbon such as 1,1,1-trichloroethane or trichloroethylene.

SUMMARY OF THE INVENTION

The present invention relates to the discovery of azeotropic or azeotrope-like compositions comprising admixtures of effective amounts of 1,1,1,2,3,4,4,5,5,5-decafluoropentane, 1,1-dichloroethane and an alcohol such as methanol, ethanol, or isopropanol to form an azeotropic or azeotrope-like composition.

DETAILED DESCRIPTION

The compositions of the instant invention are constant boiling, azeotropic or azeotrope-like compositions, or mixtures, comprising effective amounts of 1,1,1,2,3,4,4,5,5,5-decafluoropentane (HFC-43-10mee, boiling point=54.6° C.), 1,1-dichloroethane (1,1-DCE, boiling point=57.3° C.) and an alcohol such as methanol (boiling point=64.7° C.), ethanol (boiling point=78.4° C.), or isopropanol (boiling point=82.4° C.) to form an azeotropic or azeotrope-like composition.

Effective amounts of 1,1,1,2,3,4,4,5,5,5-decafluoropentane, 1,1-dichloroethane and an alcohol such as methanol, ethanol, or isopropanol to form an azeotropic or azeotrope-like composition, when defined in terms of weight percent of the components at a specific pressure or temperature, include the following.

Substantially constant-boiling, azeotropic or azeotrope-like compositions of HFC-43-10mee, 1,1-dichloroethane and methanol comprise about 55 to 75 weight percent HFC-43-10mee, about 20 to 40 weight percent 1,1- dichloroethane, and about 1 to 10 weight percent methanol. These compositions boil at about 41.8°±1.3° C., at substantially atmospheric pressure. A preferred composition comprises about 60 to 70 weight percent HFC-43-10mee, 25 to 35 weight percent 1,1-dichloroethane, and about 2 to 8 weight percent methanol. A more preferred composition is the azeotrope, which comprises about 64.6 weight percent HFC-43-10mee, about 29.9 weight percent 1,1-dichloroethane, and about 5.5 weight percent methanol, and which boils at about 41.8° C., at substantially atmospheric pressure.

Substantially constant-boiling, azeotropic or azeotrope-like compositions of HFC-43-10mee, 1,1-dichloroethane and ethanol comprise about 55 to 75 weight percent HFC-43-10mee, about 20 to 40 weight percent 1,1-dichloroethane, and about 1 to 10 weight percent ethanol. These compositions boil at about 45.2±1.3° C., at substantially atmospheric pressure. A preferred composition comprises about 60 to 70 weight percent HFC-43-10mee, 25 to 35 weight percent 1,1-dichloroethane, and about 1 to 8 weight percent ethanol. A more preferred composition is the azeotrope, which comprises about 67.3 weight percent HFC-43-10mee, about 30.2 weight percent 1,1-dichloroethane, and about 2.5 weight percent ethanol, and which boils at about 45.2° C., at substantially atmospheric pressure.

Substantially constant-boiling, azeotropic or azeotrope-like compositions of HFC-43-10mee, 1,1-dichloroethane and isopropanol comprise about 55 to 75 weight percent HFC-43-10mee, about 20 to 40 weight percent 1,1-dichloroethane, and about 0.1 to 10 weight percent isopropanol. These compositions boil at about 46.2±1.3° C., at substantially atmospheric pressure. A preferred composition comprises about 60 to 70 weight percent HFC-43-10mee, 25 to 35 weight percent 1,1-dichloroethane, and about 0.8 to 8 weight percent isopropanol. A more preferred composition is the azeotrope, which comprises about 68.5 weight percent HFC-43-10mee, about 30.3 weight percent 1,1-dichloroethane, and about 1.2 weight percent isopropanol, and which boils at about 46.2° C., at substantially atmospheric pressure.

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at pressures other than the pressure described herein.

By "azeotropic or azeotrope-like" composition is meant a constant boiling, or substantially constant boiling, liquid admixture of two or more substances that behaves as a single substance. One way to characterize an azeotropic or azeotrope-like composition is that the vapor produced by partial evaporation or distillation of the liquid has substantially the same composition as the liquid from which it was evaporated or distilled, that is, the admixture distills/refluxes without substantial composition change. Constant boiling or substantially constant boiling compositions, which are characterized as azeotropic or azeotrope-like, exhibit either a maximum or minimum boiling point, as compared with that of the nonazeotropic mixtures of the same components.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of the following criteria:

(a) The composition can be defined as an azeotrope of A, B, C (and D ...) since the very term "azeotrope" is at once both definitive and limitative, and requires that effective amounts of A, B, C (and D ...) for this unique composition of matter which is a constant boiling composition, (b) It is well known by those skilled in the art, that, at different pressures, the composition of a given azeotrope will vary at least to some degree, and changes in pressure will also change, at least to some degree, the boiling point temperature. Thus, an azeotrope of A, B, C (and D ...) represents a unique type of relationship but with a variable composition which depends on temperature and/or pressure. Therefore, compositional ranges, rather than fixed compositions, are often used to define azeotropes, (c) The composition can be defined as a particular weight percent relationship or mole percent relationship of A, B, C (and D ...), while recognizing that such specific values point out only one particular relationship and that in actuality, a series of such relationships, represented by A, B, C (and D ...) actually exist for a given azeotrope, varied by the influence of pressure, or (d) An azeotrope of A, B, C (and D ...) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The following ternary compositions are characterized as azeotropic or azeotrope-like in that mixtures within this range exhibit a substantially constant boiling point at substantially atmospheric pressure. Being substantially constant boiling, the mixtures do not tend to fractionate to any great extent upon evaporation. After evaporation, only a small difference exists between the composition of the vapor and the composition of the initial liquid phase. This difference is such that the compositions of the vapor and liquid phases are considered substantially identical. Accordingly, any compositions within this range exhibit properties which are characteristic of a true ternary azeotrope.

1. About 55 to 75 weight percent HFC-43-10mee, about 20 to 40 weight percent 1,1-dichloroethane, and about 1 to 10 weight percent methanol; and preferably about 60–70 weight percent HFC-43-10-mee, about 25–35 weight percent 1,1-dichloroethane, and about 2–8 weight percent methanol;

2. About 55 to 75 weight percent HFC-43-10mee, about 20 to 40 weight percent 1,1-dichloroethane, and about 1 to 10 weight percent ethanol; and preferably about 60–70 weight percent HFC-43-10mee, about 25–35 weight percent 1,1-dichloroethane, and about 1–8 weight percent ethanol; and 3. About 55 to 75 weight percent HFC-43-10mee, about 20 to 40 weight percent 1,1-dichloroethane, and about 0.1 to 10 weight percent isopropanol; and preferably about 60–70 weight percent HFC-43-10-mee, about 25–35 weight percent 1,1-dichloroethane, and about 0.8 to 8 weight percent isopropanol.

The following ternary compositions have been established, within the accuracy of the fractional distillation method, as true ternary azeotropes at substantially atmospheric pressure.

1. About 64.6 weight percent HFC-43-10mee, about 29.9 weight percent 1,1-dichloroethane, and about 5.5 weight percent methanol;

2. About 67.3 weight percent HFC-43-10mee, about 30.2 weight percent 1,1-dichloroethane, and about 2.5 weight percent ethanol;

3. About 68.5 weight percent HFC-43-10mee, about 30.3 weight percent 1,1-dichloroethane, and about 1.2 weight percent isopropanol.

The aforestated azeotropes have nearly zero ozone-depletion potentials.

The azeotropic or azeotrope-like compositions of the instant invention permit easy recovery and reuse of the solvent from vapor defluxing and degreasing operations because of their azeotropic natures. As an example, the azeotropic mixtures of this invention can be used in cleaning processes such as described in U.S. Pat. No. 3,881,949, or as a buffing abrasive detergent.

In addition, the mixtures are useful as resist developers, where chlorine-type developers would be used, and as resist stripping agents with the addition of appropriate halocarbons.

Another aspect of the invention is a refrigeration method which comprises condensing a refrigerant composition of the invention and thereafter evaporating it in the vicinity of a body to be cooled. Similarly, still another aspect of the invention is a method for heating which comprises condensing the invention refrigerant in the vicinity of a body to be heated and thereafter evaporating the refrigerant.

A further aspect of the invention includes aerosol compositions comprising an active agent and a propellant, wherein the propellant is an azeotropic mixture of the invention; and the production of these compositions by combining said ingredients. The invention further comprises cleaning solvent compositions comprising the azeotropic mixtures of the invention.

The azeotropic or azeotrope-like compositions of the instant invention can be prepared by any convenient method including mixing or combining the desired component amounts. A preferred method is to weigh the desired component amounts and thereafter combine them in an appropriate container.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

EXAMPLE 1

A solution containing 62.0 weight percent HFC-43-10mee, 30.0 weight 1,1-dichloroethane and 8.0 weight percent methanol was prepared in a suitable container and mixed thoroughly.

The solution was distilled in a five plate Oldershaw distillation column using a 10:1 reflux to take-off ratio. Head and pot temperatures were read directly to 1° C. The pressure was at 765.70 mmHg. Distillate compositions were determined by gas chromatography. Results obtained are summarized in Table 1.

TABLE 1

| Cuts | Temp. °C. Head | Wt. % Distilled or Recovered | HFC-43-10mee | Weight Percentages | |
|------|------|------|------|------|------|
| | | | | 1,1DCE | Methanol |
| 1 | 41 | 9.9 | 66.1 | 28.6 | 5.3 |
| 2 | 41 | 19.8 | 65.5 | 29.1 | 5.4 |
| 3 | 42 | 29.9 | 64.8 | 29.7 | 5.5 |
| 4 | 42 | 40.0 | 64.4 | 30.0 | 5.6 |
| 5 | 42 | 50.2 | 64.1 | 30.3 | 5.6 |
| 6 | 42 | 69.2 | 64.0 | 30.4 | 5.6 |
| HEEL | — | 90.7 | 56.3 | 30.6 | 13.1 |

Analysis of the above data indicates very small differences between head temperatures and distillate compositions as the distillation progressed. A statistical analysis of the data indicates that the true ternary azeotrope of HFC-43-10mee, 1,1-dichloroethane and methanol has the following characteristics at atmospheric pressure (99 percent confidence limits):

HFC-43-10mee=64.6±1.9
1,1-dichloroethane=29.9±1.5
Methanol=5.5±−0.3
Boiling Point, °C.=41.8±−1.3

EXAMPLE 2

A solution containing 62.0 weight percent HFC-43-10mee, 30.0 weight percent 1,1-dichloroethane and 8.0 weight percent ethanol was prepared in a suitable container and mixed thoroughly.

The solution was distilled in a five plate Oldershaw distillation column using a 10:1 reflux to take-off ratio. Head and pot temperatures were read directly to 1° C. The pressure was at 764.98 mmHg. Distillate compositions were determined by gas chromatography. Results obtained are summarized in Table 2.

TABLE 2

| Cuts | Temp. °C. Head | Wt. % Distilled or Recovered | HFC-43-10mee | Weight Percentages | |
|------|------|------|------|------|------|
| | | | | 1,1DCE | Ethanol |
| 1 | 45 | 10.2 | 68.6 | 29.1 | 2.3 |
| 2 | 45 | 20.3 | 68.1 | 29.5 | 2.4 |
| 3 | 45 | 30.5 | 67.5 | 30.0 | 2.5 |
| 4 | 45 | 40.6 | 67.3 | 30.2 | 2.5 |
| 5 | 45 | 51.2 | 67.0 | 30.4 | 2.6 |
| 6 | 46 | 61.5 | 66.8 | 30.6 | 2.6 |
| HEEL | — | 90.8 | 47.8 | 31.9 | 20.3 |

Analysis of the above data indicates very small differences between head temperatures and distillate compositions as the distillation progressed. A statistical analysis of the data indicates that the true ternary azeotrope of HFC-43-10mee, 1,1-dichloroethane and ethanol has the following characteristics at atmospheric pressure (99 percent confidence limits):

HFC-43-10mee=67.3±1.5

1,1-dichloroethane=30.2±1.2

Ethanol=2.5±0.2

Boiling Point, °C.=45.2±1.3

EXAMPLE 3

A solution containing 62.0 weight percent HFC-43-10mee, 8.0 weight percent 1,1-dichloroethane and 8.0 weight percent isopropanol was prepared in a suitable container and mixed thoroughly.

The solution was distilled in a five plate Oldershaw distillation column using a 10:1 reflux to take-off ratio. Head and pot temperatures were read directly to 1° C. The pressure was at 760.94 mmHg. Distillate compositions were determined by gas chromatography. Results obtained are summarized in Table 3.

TABLE 3

| Cuts | Temp. °C. Head | Wt. % Distilled or Recovered | HFC-43-10mee | 1,1DCE | Weight Percentages Isopropanol |
|---|---|---|---|---|---|
| 1 | 46 | 10.6 | 69.8 | 29.2 | 1.0 |
| 2 | 46 | 21.2 | 69.3 | 29.7 | 1.0 |
| 3 | 46 | 31.8 | 68.6 | 30.3 | 1.1 |
| 4 | 46 | 42.1 | 68.4 | 30.5 | 1.1 |
| 5 | 46 | 53.0 | 68.1 | 30.7 | 1.2 |
| 6 | 47 | 63.6 | 68.1 | 30.7 | 1.2 |
| HEEL | — | 90.9 | 43.6 | 30.6 | 25.8 |

Analysis of the above data indicates very small differences between head temperatures and distillate compositions as the distillation progressed. A statistical analysis of the data indicates that the true ternary azeotrope of HFC-43-10mee, 1,1-dichloroethane and has the following characteristics at atmospheric pressure (99 percent confidence limits):

HFC-43-10mee=68.5±1.5

1,1-dichloroethane=30.3±1.2

Isopropanol=1.2±0.3

Boiling Point, °C.=46.2±1.3

EXAMPLE 4

A suitable container was filled with mixtures shown in Table 4 and heated to the boiling point. Stainless steel nuts and bolts coated with various residues were suspended in the container for 10 seconds, then removed and observed. Results are reported in Table 4. The residues were completely removed. The residues are also soluble in each mixture as shown in Table 4.

TABLE 4

| | CLEANING AND SOLUBILITY | | | |
|---|---|---|---|---|
| WT PERCENTS | MIL-H-5606G Hydraulic Oil | Krytox Oil | Tapmatic Cutting Fluid | Dow 200 Silicone Oil |
| HFC-43-10mee/ 1,1-DCE/ Methanol 62.0/30.0/8.0 | No Residue Observed | No Residue Observed | No Residue Observed | No Residue Observed |
| -Solubility | 1% | >10% | >10% | >10% |
| HFC-43-10mee/ 1,1-DCE/ Ethanol 62.0/30.0/8.0 | No Residue Observed | No Residue Observed | No Residue Observed | No Residue Observed |
| -Solubility | 1% | >10% | >10% | >10% |

TABLE 4-continued

| | CLEANING AND SOLUBILITY | | | |
|---|---|---|---|---|
| WT PERCENTS | MIL-H-5606G Hydraulic Oil | Krytox Oil | Tapmatic Cutting Fluid | Dow 200 Silicone Oil |
| HFC-43-10mee/ 1,1-DCE/ Isopropanol 62.0/30.0/8.0 | No Residue Observed | No Residue Observed | No Residue Observed | No Residue Observed |
| -Solubility | 1% | >10% | >10% | >10% |

EXAMPLE 5

Several single sided circuit boards were coated with Alpha 611F RMA rosin flux, then activated by heating to 165° C. for two minutes. The boards were defluxed using a rinse at room temperature of azeotropic mixtures containing 62.0 weight percent HFC-43-10mee, 30.0 weight percent 1,1-dichloroethane and 8.0 weight percent methanol, ethanol or isopropanol respectively. The boards cleaned in each azeotropic mixture had no visible residue remaining thereon.

ADDITIONAL COMPOUNDS

Other components, such as aliphatic hydrocarbons having a boiling point of 35°–85° C., hydrofluorocarbonalkanes having a boiling point of 35°–85° C., hydrofluoropropanes having a boiling point of between 35°–85° C., hydrocarbon esters having a boiling point between 30°–80° C., hydrochlorofluorocarbons having a boiling point between 25°–85° C., hydrofluorocarbons having a boiling point of 25°–85° C., hydrochlorocarbons having a boiling point between 35°–85° C., chlorocarbons and perfluorinated compounds, can be added to the azeotropic or azeotrope-like compositions described above without substantially changing the properties thereof, including the constant boiling behavior, of the compositions. Examples of such components, which typically do not exceed about 10 weight percent of the total composition, include the following:

| COMPOUND | FORMULA | boiling point °C. |
|---|---|---|
| HCFC-123 | $CHCl_2CF_3$ | 27 |
| HCFC-141b | $CFCl_2CH_3$ | 32 |
| HCFC-225aa | $CHF_2CCl_2CF_3$ | 53 |
| HCFC-225ca | $CHCl_2CF_2CF_3$ | 52 |
| HCFC-225cb | $CHClFCF_2CF_2Cl$ | 56 |
| HCFC-225da | $CClF_2CHClCF_3$ | 50 |
| HFC-HFC-43-10mf | $CF_3CH_2CF_2CF_2CF_3$ | 52 |
| HFC-HFC-43-10mcf | $CF_3CF_2CH_2CF_2CF_3$ | 52 |
| FC-C-51-12 | cyclo-$C_4F_6(CF_3)_2$ | 45 |
| | $CH_3OCF_2CHFCF_3$ | 52 |
| HFC-C-456myc | cyclo-$CH_2CH_2CF_2CF(CF_3)$ | |
| HFC-C-354 | cyclo-$CF_2CF_2CH_2CH_2$ | 50 |
| | $C_4F_9CH=CH_2$ | 58 |
| MEK | $CH_3C(O)C_2H_5$ | 80 |
| THF | cyclo-$OC_4H_8$ | 66 |
| methyl formate | $HC(O)OCH_3$ | 32 |
| ethyl formate | $HC(O)OC_2H_5$ | 54 |
| methyl acetate | $CH_3C(O)OCH_3$ | 56 |
| ethyl acetate | $CH_3C(O)OC_2H_5$ | 77 |
| cyclopentane | | 49 |
| acetone | | 56 |
| 1,2-dichloroethane | | 84 |
| acetonitrile | | 82 |
| methylene chloride | | 40 |

Additives such as lubricants, corrosion inhibitors, stabilizers, surfactants, dyes and other appropriate materials may be added to the novel compositions of the invention for a variety of purposes provided they do not have an adverse influence on the composition, for their intended applications. Examples of stabilizers include nitromethane and nitroethane.

What is claimed is:

1. An azeotropic or azeotrope-like composition consisting essentially of, by weight:

(a) 55 to 75 percent 1,1,1,2,3,4,4,5,5,5-decafluoropentane, 20 to 40 percent 1,1-dichloroethane, and 1 to 10 percent methanol, having a boiling point of about 41.8°±1.3° C. at substantially atmospheric pressure;

(b) 55 to 75 percent 1,1,1,2,3,4,4,5,5,5-decafluoropentane, 20 to 40 percent 1,1-dichloroethane, and 1 to 10 percent ethanol, having a boiling point of about 45.2°±1.3° C. at substantially atmospheric pressure; or (c) 55 to 75 percent 1,1,1,2,3,4,4,5,5,5-decafluoropentane, 20 to 40 percent 1,1-dichloroethane, and 0.1 to 10 percent isopropanol, having a boiling point of about 46.2°±1.3° C. at substantially atmospheric pressure.

2. A process for preparing a thermoset or thermoplastic foam, comprising using a composition of claim 1 as a blowing agent.

3. The composition of claim 1, consisting essentially of 60 to 70 weight percent 1,1,1,2,3,4,4,5,5,5-decafluoropentane, 25 to 35 weight percent 1,1-dichloroethane, and 2 to 8 weight percent methanol; 60 to 70 weight percent 1,1,1,2,3,4,4,5,5,5-decafluoropentane, 25 to 35 weight percent 1,1-dichloroethane, and 1 to 8 weight percent ethanol; 60 to 70 weight percent 1,1,1,2,3,4,4,5,5,5-decafluoropentane, 25 to 35 weight percent 1,1-dichloroethane, and 0.8 to 8 weight percent isopropanol.

4. The composition of claim 1, consisting essentially of 64.6 weight percent 1,1,1,2,3,4,4,5,5,5-decafluoropentane, 29.9 weight percent 1,1-dichloroethane, and 5.5 weight percent methanol; 67.3 weight percent 1,1,1,2,3,4,4,5,5,5-decafluoropentane, 30.2 weight percent 1,1-dichloroethane, and 2.5 weight percent ethanol; and 68.5 weight percent 1,1,1,2,3,4,4,5,5,5-decafluoropentane, 30.3 weight percent 1,1-dichloroethane, and 1.2 weight percent isopropanol.

5. A process for cleaning a solid surface comprising treating said surface with a composition of claim 1.

6. A process for cleaning a solid surface comprising treating said surface with a composition of claim 1.

7. A process for cleaning a solid surface comprising treating said surface with a composition of claim 3.

8. A process for cleaning a solid surface comprising treating said surface with a composition of claim 4.

9. A process for producing refrigeration, comprising condensing a composition of claim 1, and thereafter evaporating said composition in the vicinity of a body to be cooled.

10. A process for producing refrigeration, comprising condensing a composition of claim 1, and thereafter evaporating said composition in the vicinity of a body to be cooled.

11. A process for producing refrigeration, comprising condensing a composition of claim 3, and thereafter evaporating said composition in the vicinity of a body to be cooled.

12. A process for producing refrigeration, comprising condensing a composition of claim 4, and thereafter evaporating said composition in the vicinity of a body to be cooled.

13. A process for preparing a thermoset or thermoplastic foam, comprising using a composition of claim 1 as a blowing agent.

14. A process for preparing a thermoset or thermoplastic foam, comprising using a composition of claim 3 as a blowing agent.

15. A process for preparing a thermoset or thermoplastic foam, comprising using a composition of claim 4 as a blowing agent.

* * * * *